Oct. 13, 1931.                M. ALLAND                1,827,502
                    COMBINED VALVE AND MIXING DEVICE
                         Filed June 18, 1929
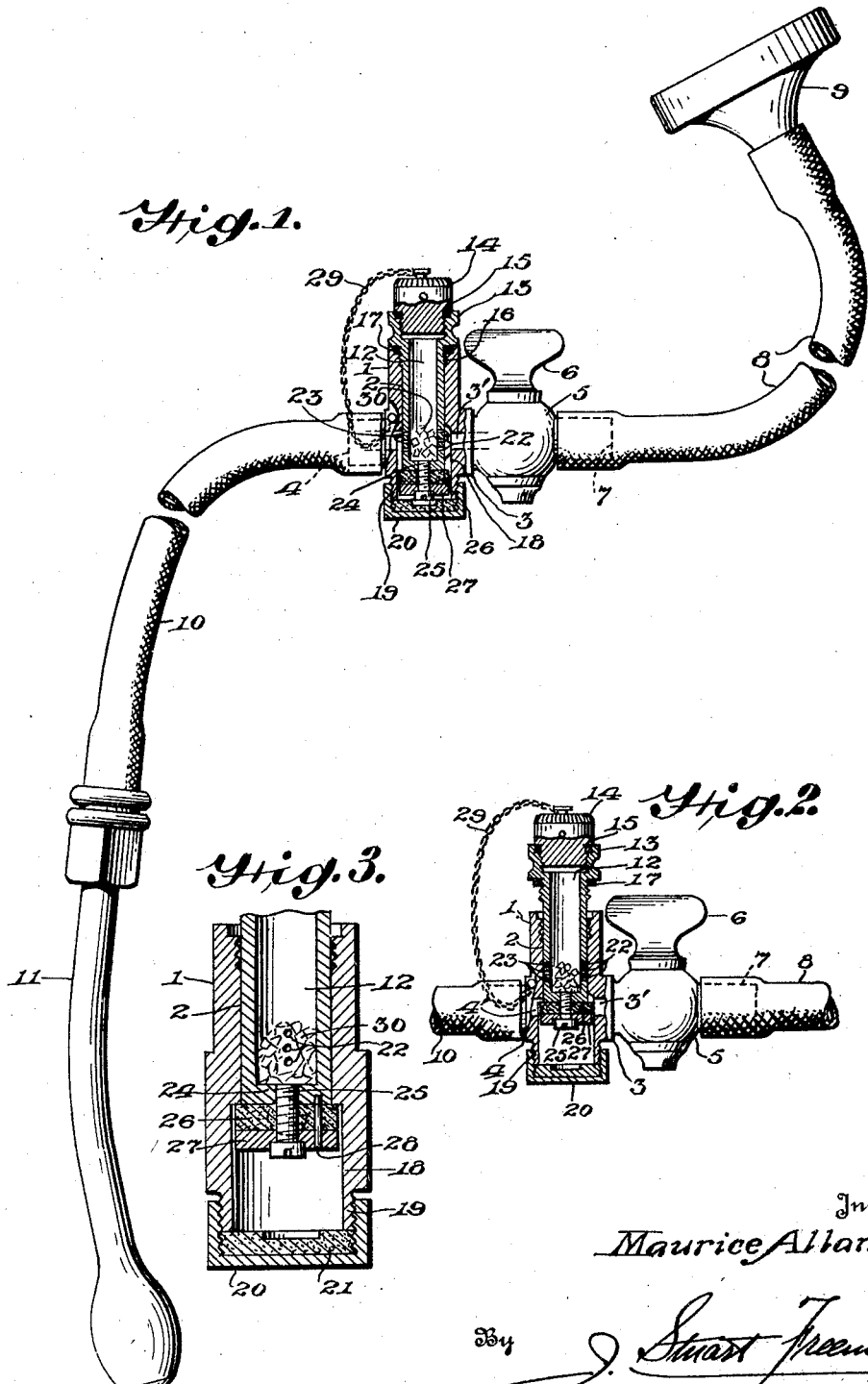
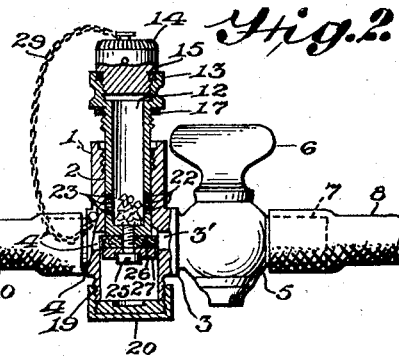
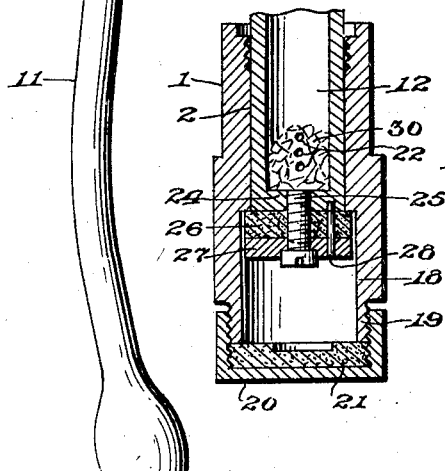
Inventor
Maurice Alland,
By J. Stuart Freeman
Attorney Patented Oct. 13, 1931

1,827,502

UNITED STATES PATENT OFFICE

MAURICE ALLAND, OF ATLANTIC CITY, NEW JERSEY

COMBINED VALVE AND MIXING DEVICE

Application filed June 18, 1929. Serial No. 371,758.

The object of the invention is to provide improvements in combined valves and mixing devices, particularly for such purposes as those met with in the use of syringes, disinfectant and spraying apparatus.

In this class of apparatus it has long been customary to prepare a mixture of antiseptics, disinfectants and the like in a vessel and to lead the fixed mixture from the vessel to the desired point of application without substantial alteration, and controlled at most only by a suitable valve. However, there are many instances when fluids of different nature or strength are desired selectively, such for example as the use of clear water first, followed by the use of an antiseptic, or disinfectant, and vice versa, as in medical practice. Also in the spraying of trees, plants, vines and the like, it has long been recognized that it would be desirable in many instances to switch at will from a chemical designed to kill sap-sucking insects to one which is effective against leaf-eating insects, without first having to remove the former preparation from the bucket, tank or other reservoir, before being able to insert therein and make use of the latter.

The object therefore has been to provide a casing, which embodies in addition to a suitable valve, a simple arrangement for mixing a given substance with a fluid passing therethrough, comprising a chamber having inlet and outlet ports and in which is slidably positioned a second container adapted to contain either a liquid or a soluble solid, said second container when in withdrawn position being removed from the direct flow of liquid through the first container, but when in normal operative position said second container being so placed that fluid passing into and through said first container also passes through inlet and outlet apertures in the second container, and thereby gains access to the contents of the latter which are gradually carried off by the fluid in a relatively weak solution.

With these and other objects in mind the present invention comprises further details of construction and operation which are fully brought out in the following description when read in conjunction with the accompanying drawings, in which Fig. 1 is a partial side elevational and vertical, longitudinal sectional view of one embodiment of the invention in association with any well-known form of tubes, nozzle and faucet attaching means; Fig. 2 is a similar section of the device per se with the inner container in withdrawn position; and Fig. 3 is an enlarged fragmentary diametrical section of the lower portion of the device shown in Fig. 2 and at right angles with the plane thereof.

Referring to the drawings, the invention primarily comprises a container 1, having a tubular bore 2, provided with radial extensions 3 and 4 provided respectively with inlet and outlet apertures 3' and 4'. To the extension 3 is preferably integrally connected a valve casing 5, containing any suitable form of valve having a manually engageable knob 6, and itself provided with an extension 7, to which is secured one end of a flexible tube 8, the opposite end of which is attached to any suitable form of faucet connecting means 9. To the second container extension 4 is also secured one end of a flexible tube 10, which, in this instance, is connected to any suitable type of nozzle 11, depending upon the purpose for which the device is intended to be used.

Slidable within the bore 2 is a cylinder 12, having an enlarged internally threaded head 13, adapted to removably receive the externally threaded plug 14, which is preferably provided with a fluid sealing washer 15, while beneath the head 13 the cylinder 12 is provided with screw threads 16, adapted when the cylinder is in its inner-most position to engage corresponding threads within the bore 2, to maintain said casing and cylinder in normal operative position; a washer 17 being provided, if desirable, to prevent the escape of fluid outwardly through said bore between the walls of the container and cylinder.

The bore 2 in the lower portion of the container 1 is radially enlarged to provide a chamber 18, into and from which lead the inlet and outlet bores 3' and 4', respectively. The lowermost portion 19 of said container is externally threaded to receive a detachable cap 20, which is provided inwardly with a gasket 21, which binds against the lower portion of the container to effect a seal to prevent the escape of fluid thereby.

The lower portion of the cylinder 12, which in effect comprises an inner container, is provided with as many relatively restricted inlet and outlet apertures 22 and 23, as may be desired, the bottom of said cylinder being closed by a wall 24 into which extends a small bolt or screw 25, which secures to said wall a gasket 26, which is of slightly greater diameter than said cylinder, but is of less diameter than the enlarged portion 18 of the container bore 2, and which is secured in position by means of a preferably metallic plate 27, said plate and gasket being normally prevented from relative rotation by means of a pin, or the like, 28 which extends through them and into the bottom wall 24 of the cylinder 12.

The cylinder or inner container 12 may be filled to the desired extent with any suitable solution or soluble solid, such for instance as potassium permanganate, after which the plug 14 is replaced, as shown in the drawings, said plug being preferably connected loosely with the container 1 by means of a flexible chain or the like 29, to prevent accidental separation therefrom and possible loss. When said cylinder is in its lowermost and normally operative position, as shown in Fig. 1, and the valve being turned so as to permit water or other fluid to flow through the tubes 8 and 10, said fluid passes inwardly through the inlet bore 3', into the bore enlargement 18 and outwardly through the outlet bore 4', some of such fluid having passed into the interior of the cylinder 12 through the apertures 22, where it dilutes and assimilates with the chemical 30, carrying a portion of such chemical outwardly through the apertures 23 to join other of such fluid which has passed circumferentially around the outer surface of said cylinder.

It is obvious that manipulation of the valve 6 regulates the flow of the fluid from the nozzle 11 from zero to maximum capacity of the channel passing through the device, and any rates of flow between these two extremes. However, when it is desired to permit only clear water or other fluid to pass through said tubes and from said nozzle, the cylinder head 13 is rotated so as to disengage the retaining threads 16 and permit the cylinder to be withdrawn longitudinally into, and in fact slightly above, the position shown in Fig. 2. In this latter position it will be noted that the inlet and outlet apertures of the cylinder are closed and that clear fluid flowing inwardly through the inlet bore 3' passes around the loose fitting gasket 26 and freely through the outlet bore 4'. The gasket it will be noted affords a means for limiting the relatively upward movement of the cylinder 12 and in its uppermost position serves to effectively close and prevent the escape of fluid from the container 1 through the bore 2 around the outer surface of the cylinder 12. From this position it is obvious that said cylinder may again be moved inwardly into the operative position shown in Fig. 1, and when the chemical 30 has been completely dissolved and carried off, further such chemical, or a substitute therefor may be inserted within said cylinder by first removing therefrom the plug 14.

Having thus described my invention, what I claim and desire to protect by Letters Patent of the United States is:—

A mixing device, comprising an outer container having a bore provided with a peripheral shoulder beyond which there is an enlargement of said bore into which lead inlet and outlet ports, a second container reciprocable longitudinally within said bore and having inlet and outlet apertures which in one relative position of said containers communicate with said ports, and when said containers are in another relative position the apertures of said second container being closed within and by the slidably contacting wall of said bore, and a gasket larger than said bore carried by said inner container and when in cooperation with said shoulder being operative to both limit the relative movement of said containers in one direction and to maintain said apertures closed by preventing them from emerging from and beyond the surrounding wall of said first container, and to prevent fluid escaping from within said bore enlargement past said shoulder and said inner container.

In testimony whereof I have affixed my signature.

MAURICE ALLAND.